(12) United States Patent
Nakamura

(10) Patent No.: US 10,848,649 B2
(45) Date of Patent: Nov. 24, 2020

(54) IMAGING DEVICE HAVING HEAT RADIATION STRUCTURE

(71) Applicant: DENSO CORPORATION, Kariya (JP)

(72) Inventor: Mitsuru Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/698,455

(22) Filed: Sep. 7, 2017

(65) Prior Publication Data

US 2018/0069994 A1    Mar. 8, 2018

(30) Foreign Application Priority Data

Sep. 8, 2016 (JP) ................... 2016-175790

(51) Int. Cl.
| | |
|---|---|
| *H04N 5/00* | (2011.01) |
| *H04N 5/225* | (2006.01) |
| *G03B 17/55* | (2006.01) |
| *G03B 17/02* | (2006.01) |
| *B60J 1/20* | (2006.01) |

(52) U.S. Cl.
CPC .......... *H04N 5/2252* (2013.01); *G03B 17/02* (2013.01); *G03B 17/55* (2013.01); *H04N 5/2253* (2013.01); *H04N 5/2254* (2013.01); *H04N 5/2257* (2013.01); *B60J 1/20* (2013.01); *B60Y 2400/3015* (2013.01); *B60Y 2410/10* (2013.01); *B60Y 2410/114* (2013.01)

(58) Field of Classification Search
CPC .. H04N 5/2257; H04N 5/2253; H04N 5/2254; H04N 5/2252; G03B 17/55; G03B 17/02; B60J 1/20; B60Y 2410/114; B60Y 2410/10; B60Y 2400/3015
See application file for complete search history.

(56) References Cited

U.S. PATENT DOCUMENTS

| | | | | |
|---|---|---|---|---|
| 2012/0155855 A1* | 6/2012 | Okuda | ............... | B60R 11/04 396/535 |
| 2013/0037902 A1* | 2/2013 | Nakazawa | ........ | H01L 27/14623 257/432 |
| 2013/0321496 A1* | 12/2013 | Weller | ............. | G02B 6/0078 345/694 |
| 2014/0016919 A1* | 1/2014 | Okuda | ............. | G03B 17/565 396/25 |

(Continued)

FOREIGN PATENT DOCUMENTS

| | | |
|---|---|---|
| JP | 2003-300414 A | 10/2003 |
| JP | 2007-196721 | 8/2007 |
| JP | 2013-211756 A | 10/2013 |

*Primary Examiner* — Zhihan Zhou
(74) *Attorney, Agent, or Firm* — Maschoff Brennan

(57) ABSTRACT

An imaging device installed inside a windshield of a vehicle, capturing images from ahead of the vehicle is provided. The imaging device includes a housing, a lens, an imaging device and a processing board. The housing includes a first portion, facing the windshield, and a second portion located opposite to the first portion. The first portion has a first outer surface as an outer surface thereof, and the second portion has a second outer surface as an outer surface thereof. The first outer surface has a light reflectance which is larger than a light reflectance of the second outer surface. The processing board is provided in the housing, and the processing circuit is provided on the processing board, facing the second portion only.

12 Claims, 6 Drawing Sheets

(56) References Cited

U.S. PATENT DOCUMENTS

| | | | |
|---|---|---|---|
| 2014/0160284 A1* | 6/2014 | Achenbach | H04N 5/2251 348/143 |
| 2015/0085140 A1 | 3/2015 | Shimizu | |
| 2015/0109447 A1* | 4/2015 | Okuda | B60R 11/04 348/148 |
| 2015/0264230 A1* | 9/2015 | Takeda | H04N 5/2252 348/95 |
| 2016/0119509 A1 | 4/2016 | Wato | |
| 2016/0307953 A1 | 10/2016 | Kono et al. | |

* cited by examiner

IMAGING DEVICE HAVING HEAT RADIATION STRUCTURE

CROSS-REFERENCE TO RELATED APPLICATION

This application is based on and claims the benefit of priority from earlier Japanese Patent Application No. 2016-175790 filed Sep. 8, 2016, the description of which is incorporated herein by reference.

BACKGROUND OF THE INVENTION

Technical Field

The present disclosure relates to an imaging device mounted on a vehicle.

Description of Related Art

In the field of imaging devices, JP-A-2013-211756 proposes an imaging device which can be mounted in the vicinity of a joint portion of a rear view mirror installed in the top center of a windshield of the vehicle. The imaging device is provided with an imaging section that captures an object, and a control section electrically connected to the imaging section, executing necessary control processes for the captured image.

For an imaging device such as a device disclosed in the above-mentioned patent literature, when being installed inside the wind shield, the sunlight entering through the windshield directly shines on the imaging device. Hence, the temperature of the whole imaging device is likely to increase. In the case where the control section is included in the imaging device, since the control section produces heat, the temperature of the whole device is even more likely to increase. In this case, when the temperature of the imaging device exceeds the maximum operating temperature, the function of the device may be lost.

SUMMARY

In light of the above-described circumstances, as an aspect of the present disclosure, it is desired to provide an imaging device capable of suppressing a temperature rise of the whole imaging device. As one aspect of the present disclosure, an imaging device installed inside a windshield of a vehicle, capturing images from ahead of the vehicle is provided. The imaging device includes a housing; a lens; an imaging device; and a processing board.

The lens is exposed to a part of the housing, the lens obtaining an optical image ahead of the vehicle. The imaging device is provided in the housing, converting the optical image into an electrical image signal. The processing board includes a processing circuit that executes signal processing of the image signal converted by the imaging device.

The housing includes a first portion and a second portion in a state where the housing is installed inside the windshield, the first portion being a portion of the housing, facing the windshield, and the second portion being a portion of the housing located opposite to the first portion, the first portion having a first outer surface as an outer surface thereof, and the second portion having a second outer surface as an outer surface thereof.

The first outer surface has a light reflectance which is larger than a light reflectance of the second outer surface. The processing board is provided in the housing, and the processing circuit is provided on the processing board, facing the second portion only.

The imaging device thus configured suppresses heat absorption on the first outer surface to which direct sun light is likely to shine. As a result, temperature rise in the whole imaging device can be suppressed.

The direct sun light is unlikely to shine on the second outer surface compared to the first outer surface so that a temperature of the second outer surface is likely to be lowered compared to the first outer surface.

Therefore, according to the configuration in which the processing circuit does not face the first portion, but faces the second portion, heat produced by the processing circuit can be radiated from the second portion having lower temperature than that of the first portion. As a result, temperature rise in the whole imaging device can be suppressed.

It should be noted that the bracketed reference signs of individual means in this column and in the claims indicate correspondence to specific means in the embodiments described later, and do not limit the technical scope of the present disclosure.

DETAILED DESCRIPTION OF PREFERRED EMBODIMENTS

Figure 1:
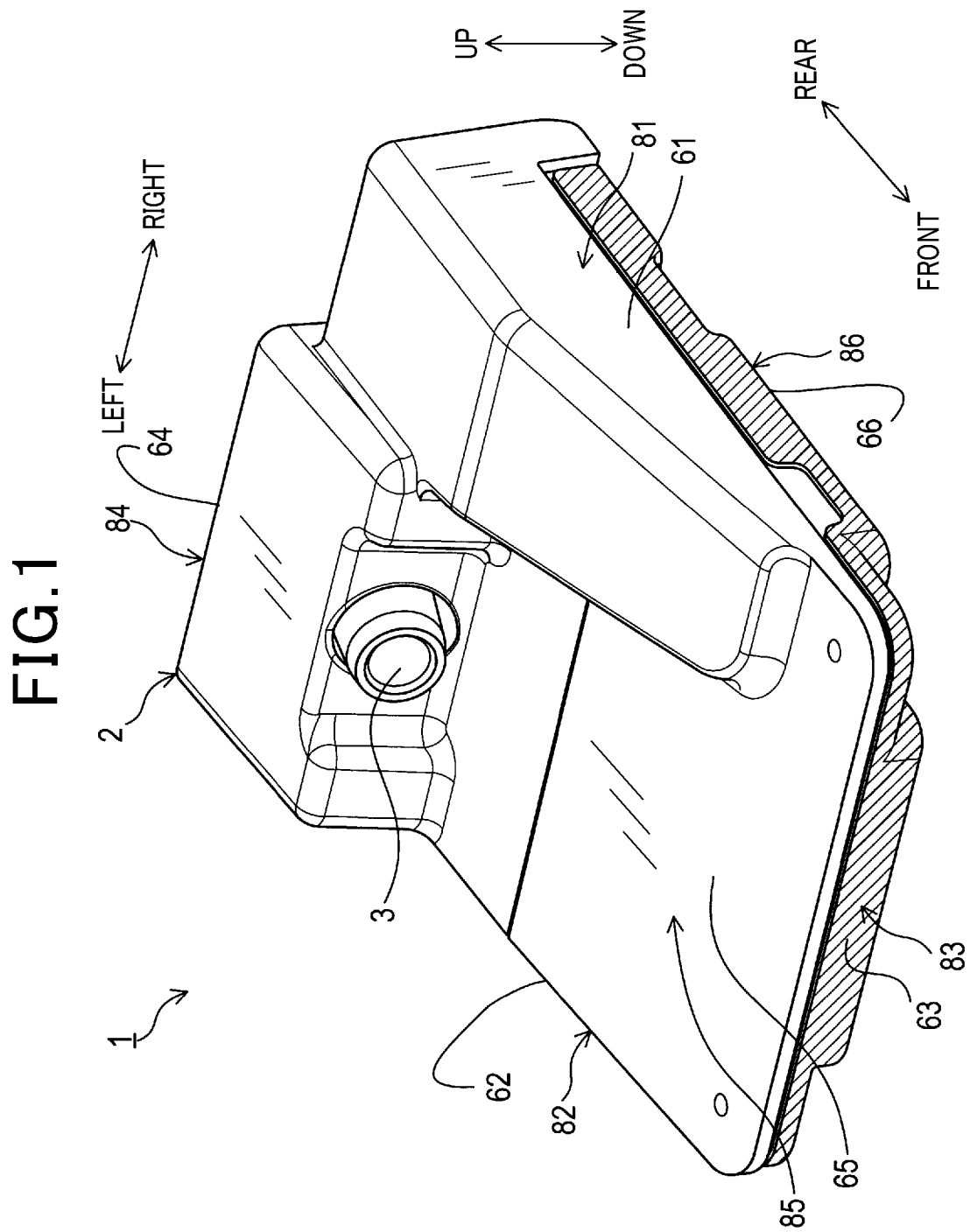
FIG. 1 is a perspective view showing an exterior of an imaging device according to a first embodiment, when viewed from an upper front-right direction.

With reference to the drawings, embodiments of the present disclosure will be described.

1. First Embodiment

[1-1. Configuration of Imaging Device 1]

With reference to FIGS. 1 to 4, a configuration of the imaging device 1 will be described. The imaging device 1 is installed inside the windshield and captures images ahead of the vehicle. In the following description, directions of front, rear, right, left, upward, downward of respective members in the imaging device 1 are defined as directions of the members when the imaging device 1 is installed inside the windshield. In other words, according to this definition, the front direction of the respective members corresponds to the front side direction of the vehicle.

As shown in FIGS. 1 to 4, the imaging unit 1 includes a housing 2, an optical unit 12, an imaging board 30 and a processing board 5. The optical unit 12, the imaging board 30 and the processing board 5 are provided in the housing 2.

Figure 2:
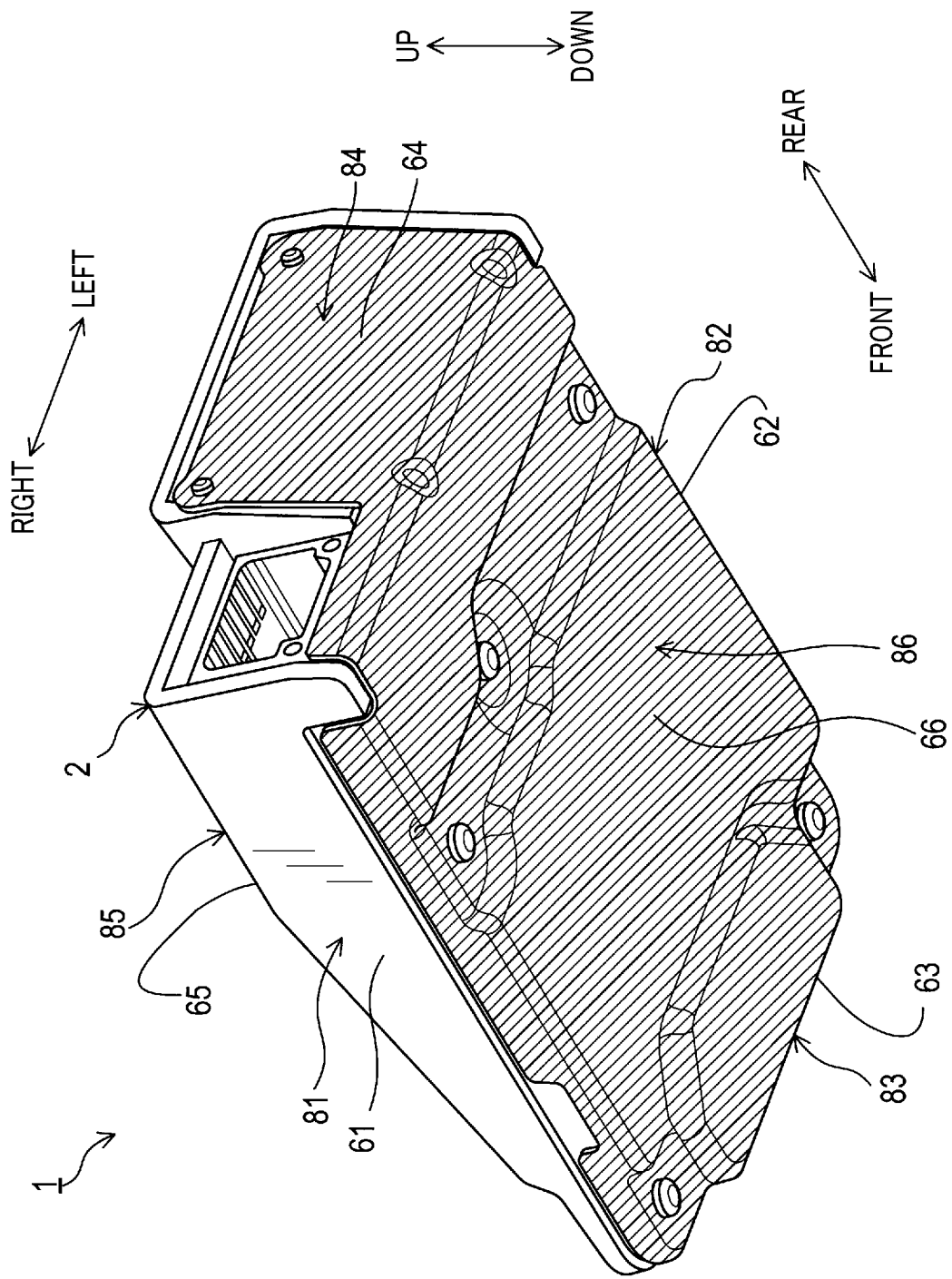
FIG. 2 is a perspective view showing an exterior of the imaging device according to the first embodiment, when viewed from an upper rear-right direction.

As shown in FIGS. 1 and 2, the housing 2 is a box shaped member having a shape such that the thickness becomes smaller towards the front side. The housing 2 is provided with a right side wall 81 and a left side wall 82, a front side wall 83 and a rear side wall 84, an upper wall 85 and a bottom wall 86. The right side wall 81 and the left side wall 82 face each other, and are located apart from each other, having a distance therebetween in the left-right direction. The front side wall 83 and the rear side wall 84 disposed in the front-rear direction to connect the right side wall 81 and the left side wall 82. The upper wall 85 and the bottom wall 86 are disposed in the upward-downward direction to connect the right side wall 81 and the left side wall 82. The housing 2 includes a right side surface 61 which is an outer surface of the right side wall 81, a left side surface 62 which is an outer surface of the left side wall 82, a front side surface 63 which is an outer surface of the front side wall 83, a rear side surface 64 which is an outer surface of the rear side wall 84, an upper surface 65 which is an outer surface of the upper wall 85, and a lower surface 66 which is an outer surface of the bottom wall 86. The upper surface 65 of the housing 2 face the windshield in a state where the imaging device is installed inside the windshield. In other words, the upper wall 85 is a part of the housing 2, facing the wind shield, and the bottom wall 86 is a part of the casing, being located opposite to the upper wall 85. The upper wall 85 corresponds to the first portion, the bottom wall 86 corresponds to the second portion, the upper surface 65 corresponds to the first outer surface, and the lower surface 66 corresponds to the second outer surface.

Figure 3:
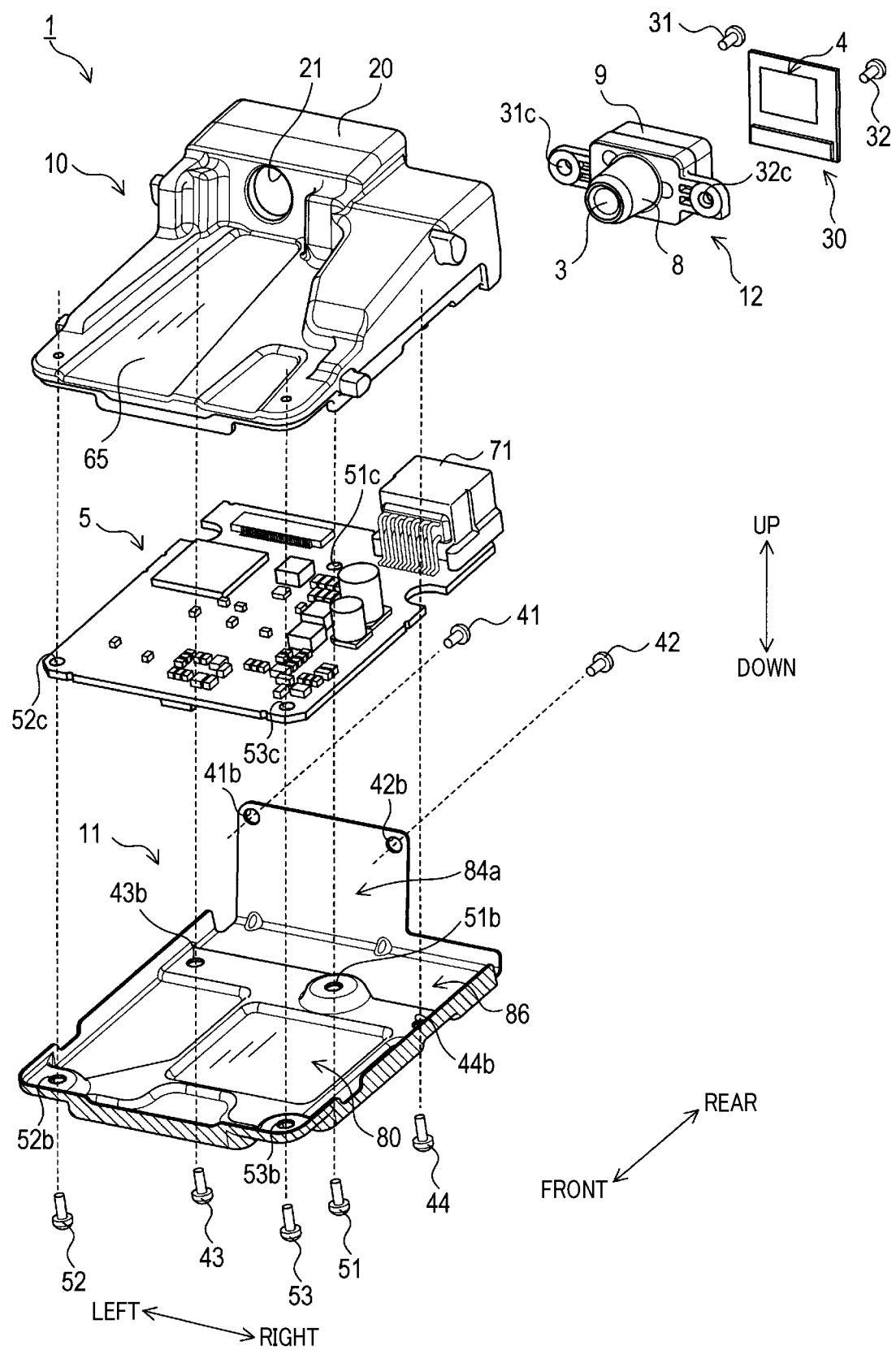
FIG. 3 is an exploded view showing the imaging device according to the first embodiment, when viewed from an upper right-front direction.
Figure 4:
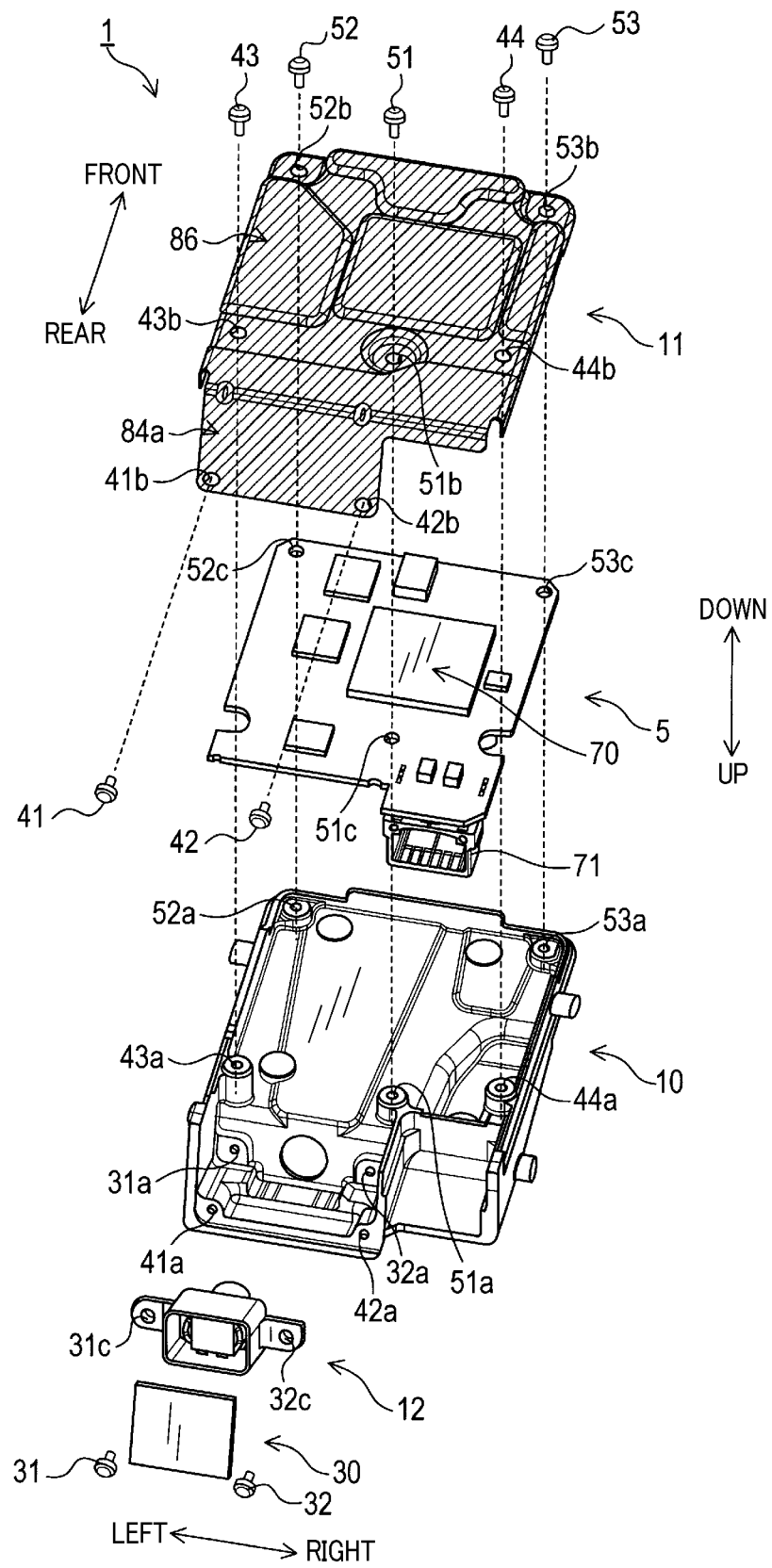
FIG. 4 is an exploded view showing the imaging device according to the first embodiment, when viewed from a downward direction.

As shown in FIGS. 3 and 4, the housing 2 is provided with two components of a casing 10 and a cover 11. The housing 2 is formed integrally with the casing 10 and the cover 11, in which they are adjoined being faced each other. The casing 10 constitutes a part of the upper wall 85 and the side walls 81 to 84 of the housing 2. The cover 11 constitutes a part of the bottom wall 86 and the side walls 81 to 84. In other words, the upper surface 65 of the housing 2 corresponds to the upper surface 65 of the casing 10, and the lower surface 66 of the housing 2 corresponds to the lower surface 66 of the cover 11.

The casing 10 is constituted of an aluminum material, appearing silver which is the inherent color of the aluminum. Hence, the upper surface 65 of the casing 10 appears silver. The casing 10 includes an upper wall 85, a part of the right side wall 81, a part of the left side wall 82, a part of the front side wall 83, and the rear side wall 84. The upper wall 85 includes a rising portion 20 which is rising upward in a rear portion of the upper wall 85, in order to accommodate the optical unit 12 and the imaging board 30. The rising portion 20 includes a lens hold 21 having an opening towards the front side.

The casing 10 two screw holes 31a and 32a used for being joined with the optical unit 12, four screw holes 41a, 42a, 43a, 44a used for being joined with the cover 11, three screw holes 51a, 52a, 53a for co-fastening the cover 11 and the processing board 5. The cover 11 is constituted of an aluminum material. In the cover 11, a black coating is applied to portions outside the cover 11 when being adjoined to the casing 10. Portions being coated with black are illustrated with oblique lines in FIGS. 1 to 4, 6 and 7. In other words, at least the lower surface 66 of the cover 11 is black.

The cover 11 includes the bottom wall 86, a partial rear side wall 84a which is a part of the rear side wall 84, a part of the front side wall 83, a part of the right side wall 81, and a part of the left side wall 82. Hereinafter, a portion which is a part of the rear side wall 84, constituting the cover 11 is referred to as a third portion 84a. The bottom wall 86 is a plate shape portion having a lower surface 66 of the cover 11. The third portion 84a is provided, in a rear side of the housing 2 with respect to the vehicle, to stand from the bottom wall 86, in a state where the housing 2 is installed inside the windshield. In an interior surface of the bottom wall 86 includes a thermal conduction member 80 disposed between the bottom wall 86 and an image processing LSI 70 which will be described later. The thermal conduction member 80 is formed of a member having high thermal conductivity so as to transfer heat between the bottom wall 86 and the image processing LSI 70. As the thermal conduction member 80, for example, a thermal conduction sheet or the like can be used.

The cover 11 includes four through holes 41b, 42b, 43b, 44b used for adjoining with the casing 10, and three through holes 51b, 52b, and 53b used for co-fastening the casing 10 and the processing board 5.

The optical unit 12 is provided with a lens barrel 8, a base portion 9 and a lens 3. The lens barrel 8 and the base portion 9 are integrally formed by a resin. The lens barrel 8 has a cylindrical shape and holds the lens 3. The lens 3 is exposed to the lens hole 21, and arranged in an optical axis direction such that the optical axis is aligned with the center line of the lens barrel 8, thereby capable of receiving light from ahead of the vehicle.

The base portion 9 has a rectangular parallelepiped shape that expands in a direction perpendicular to the optical axis of the lens 3 and is opened at the rear end. The base portion 9 has a mounting portion extending in the left and right directions, at which two through holes 31c and 32c are provided so as to fix the optical unit 12 to the casing 10.

The imaging board 30 includes an imaging device 4 mounted thereon. The imaging device 4 has a rectangular shape and is configured such that the surface thereof is formed as a single surface serving as a reception surface. The imaging device converts a captured image of an object imaged on the reception surface to an electrical image signal. Specifically, the imaging device 4 is configured of a semiconductor image sensor device such as a CMOS image sensor.

The imaging board 30 is a plate member that outputs the image signal which is converted in the imaging device 4 to the processing board 5. The imaging board 30 is mounted in an opening end provided in a rear portion of the base portion 9 such that a surface on which the imaging device 4 is provided faces towards the front side. The imaging board 30 is accommodated in the rising portion 20 together with the optical unit 12, and arranged inside the third portion 84a of the imaging board in a state where the casing 10 and the cover 11 are adjoined.

The processing board 5 is a plate-like member that records an image signal captured by the imaging device 4 or an image signal processed by the image processing LSI 70, or transmits these image signals to other apparatuses. Specifically, the processing board 5 is disposed such that one surface of the processing board 5 faces the upper wall 85 and the other surface of the processing board 5 faces the bottom wall 86. The processing board 5 includes three through holes 51c, 52c and 53c in order to co-fasten the casing 10 and the cover 11.

The processing board 5 includes LSIs including the image processing LSI 70 and a connector 71 mounted thereon. LSI is abbreviation of Large Scale Integration. According to the first embodiment, the image processing LSI has the largest area among the LSIs mounted on the processing board 5. The image processing LSI 70 is a plate member that performs signal processing for an image signal converted by the imaging device 4. The imaging processing LSI 70 contacts the bottom wall 86 via the thermal conduction member 80. The connector 71 is used for supplying power and for a communication, and is provided at a rear right side of the housing 2. The connector 71 supplies power of the vehicle to the imaging device, and externally outputs a calculation results calculated by the processing board 5. It should be noted that the image processing LSI 70 corresponds to a processing circuit, and the LSIs corresponds to integrated circuits.

The casing 10 and the optical unit 12 are joined by two screws 31 and 32. The two screws 31 and 32 are respectively screwed into the screw holes 31*a* and 32*a* via the through holes 31*c* and 32*c* provided in the base portion 9, whereby the casing 10 and the optical unit 12 are joined.

The casing 10 and the cover 11 are adjoined by four screws 41, 42, 43 and 44. The four screws 41, 42, 43 and 44 screw the screw holes 41*a*, 42*a*, 43*a*, and 44*a* provided in the casing 10 via the through holes 41*b*, 42*b*, 43*b* and 44*b*, respectively, thereby adjoining the casing 10 and the cover 11.

Figure 5:
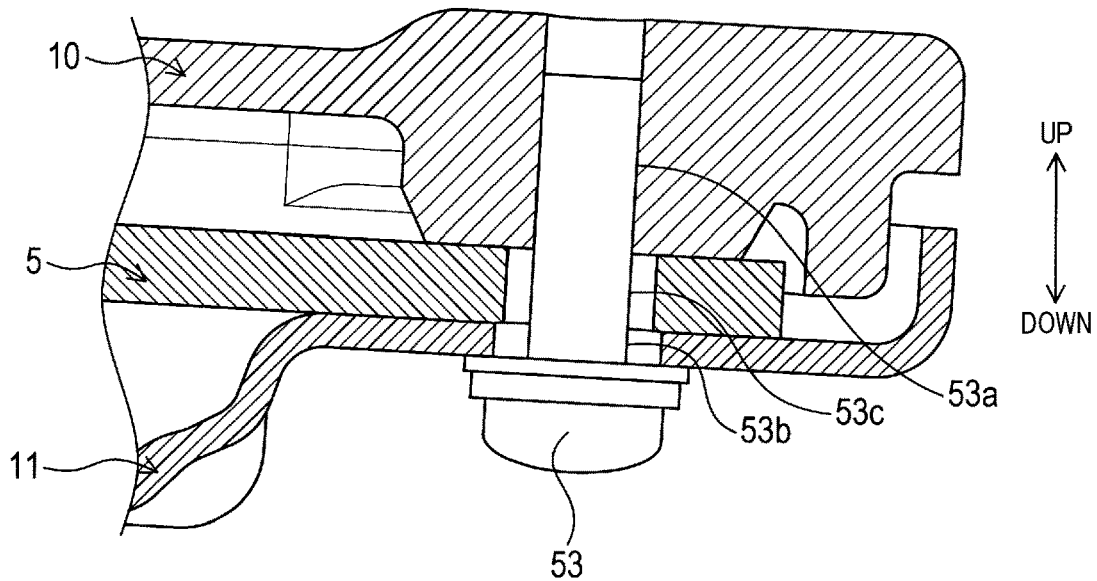
FIG. 5 is an explanatory diagram showing a co-fastening of the imaging device according to the first embodiment.

The case 10, the cover 11, and the processing board 5 are co-fastened by the three screws 51, 52 and 53. Specifically, as shown in FIG. 5, the screw 53 is inserted into the screw hole 53*a* provided in the casing 10, via the through hole 53*b* provided on the cover 11 and the through hole 53*c* provided on the processing board 5. Similarly, the screw 51 is inserted into the screw hole 51*a* via the through holes 51*b* and 51*c*. The screw 52 is inserted into the screw hole 52*a* via the through holes 52*b* and 52*c*.

[1-2 Effect and Advantages]

According to the above-described first embodiment, the following effects and advantages can be obtained.

(1a) The upper surface 65 of the housing 2 is silver and the lower surface 66 is black. Hence, compared to the imaging device in which the upper surface of the housing 2 is coated with a color other than black, heat absorption on the upper surface 65 to which direct sun light is likely to shine can be suppressed. Therefore, the imaging device 1 according to the present disclosure is able to minimize a temperature rise in the whole imaging device 1.

Also, direct sun light is unlikely to shine on the lower surface 66 compared to the upper surface 65 so that a temperature of the bottom wall 86 is likely to be lowered compared to the upper wall 85. Further, the lower surface 66 faces the vehicle cabin, the temperature of which is likely to be lowered. Therefore, according to a configuration in which the image processing LSI 70 is provided in the processing board 5 facing the bottom wall 86, heat produced by the image processing LSI 70 can readily be radiated from the bottom wall 86 of which the temperature is lower than the upper wall 85, compared to a configuration in which the image processing LSI 70 is disposed on the processing board 5, facing the upper wall 85. Therefore, the imaging device 1 according to the present disclosure can avoid a temperature rise inside the imaging device 1, so that temperature rise in the whole imaging device 1 can be minimized.

(1b) The lower surface 66 of the housing 2 is black. Hence, when the lower surface 66 is other than black, for example compared to silver which is the color of aluminum, an effect of the heat dissipation can be improved. Accordingly, the temperature rise inside the imaging device 1 of the present disclosure can be suppressed. As a result, temperature of the whole imaging device 1 can be prevented from being increased.

(1c) The casing 10 and the cover 11 are separate members. Hence, compared to an imaging device in which the casing 10 and the cover 11 are integrated by molding, heat produced from direct sun light is unlikely to transfer to the cover 11 from the casing 10. Therefore, according to the imaging device 1 of the present disclosure, temperature rise of the whole imaging device 1 can be avoided.

(1d) The casing 10, the cover 11 and the processing board 5 are co-fastened. Hence, noise produced by the image processing LSI 70 can be prevented from propagating outside. In other words, EMC performance can be secured. It should be noted that EMC is abbreviation of electromagnetic compatibility.

Likewise, the casing 10 and the cover 11 and the processing board 5 are co-fastened at three locations. Thus, these members are fastened at several locations, whereby the EMC performance can be secured and the thermal conductivity of the casing 10 and the cover 11 can be lowered. Therefore, the EMC performance can be secured and a temperature rise of the whole imaging device 1 can be secured and as well.

(1e) The image processing LSI 70 and the imaging device 4 are arranged apart from each other. Therefore, heat transfer can be suppressed between the image processing LSI 70 as a heat source and the imaging device 4 that is likely to be affected by heat. Accordingly, the imaging device can be protected from heating.

(1f) The image processing LSI 70 contacts with the bottom wall 86 via the heat conduction member 80. Therefore, heat produced by the image processing LSI 70 can be radiated via the heat conduction member 80.

2. Second Embodiment

[2-1. Difference Between Second Embodiment and the First Embodiment]

Figure 6:
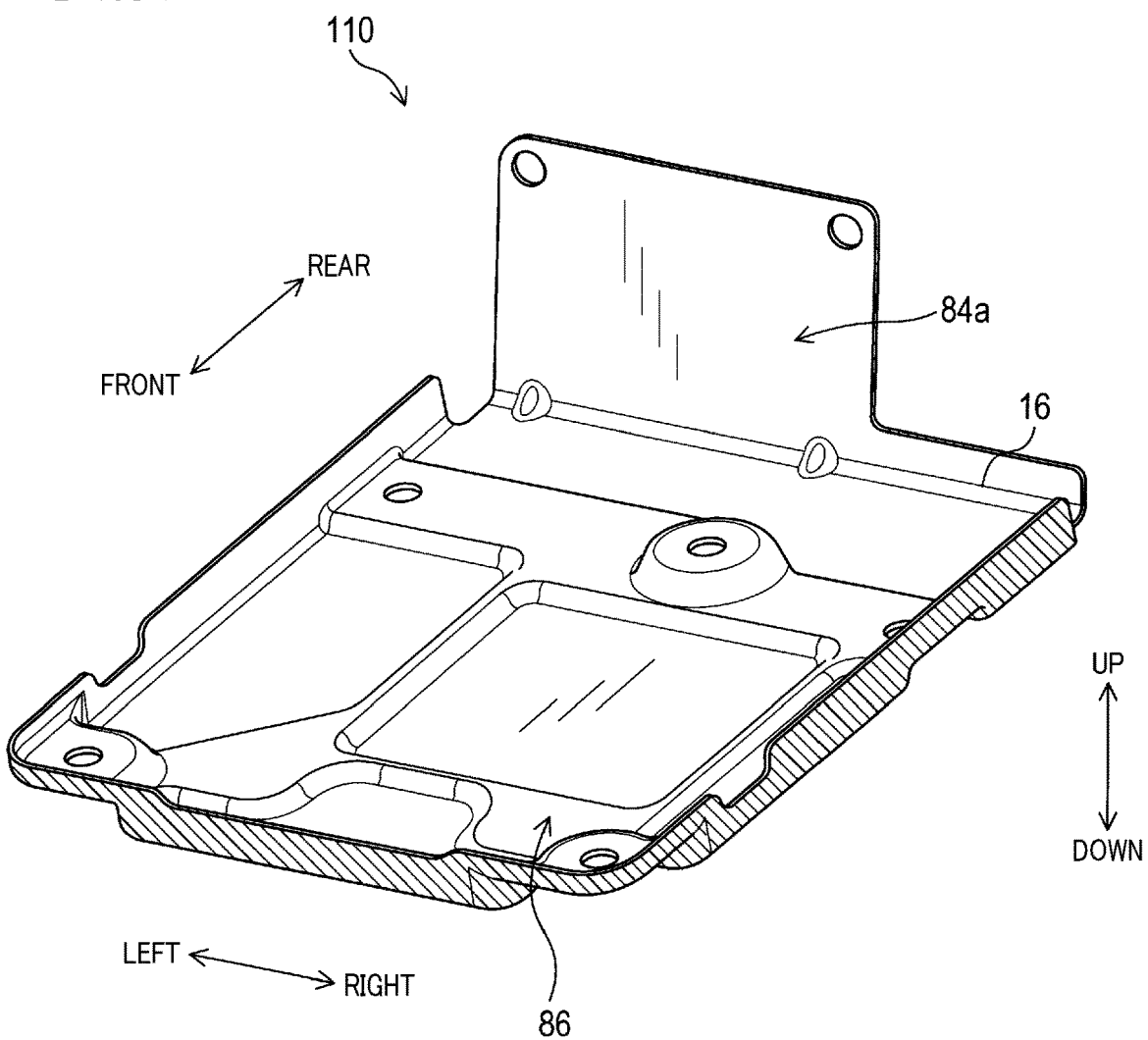
FIG. 6 is a perspective view showing a cover of an imaging device according to the second embodiment.
Figure 7:
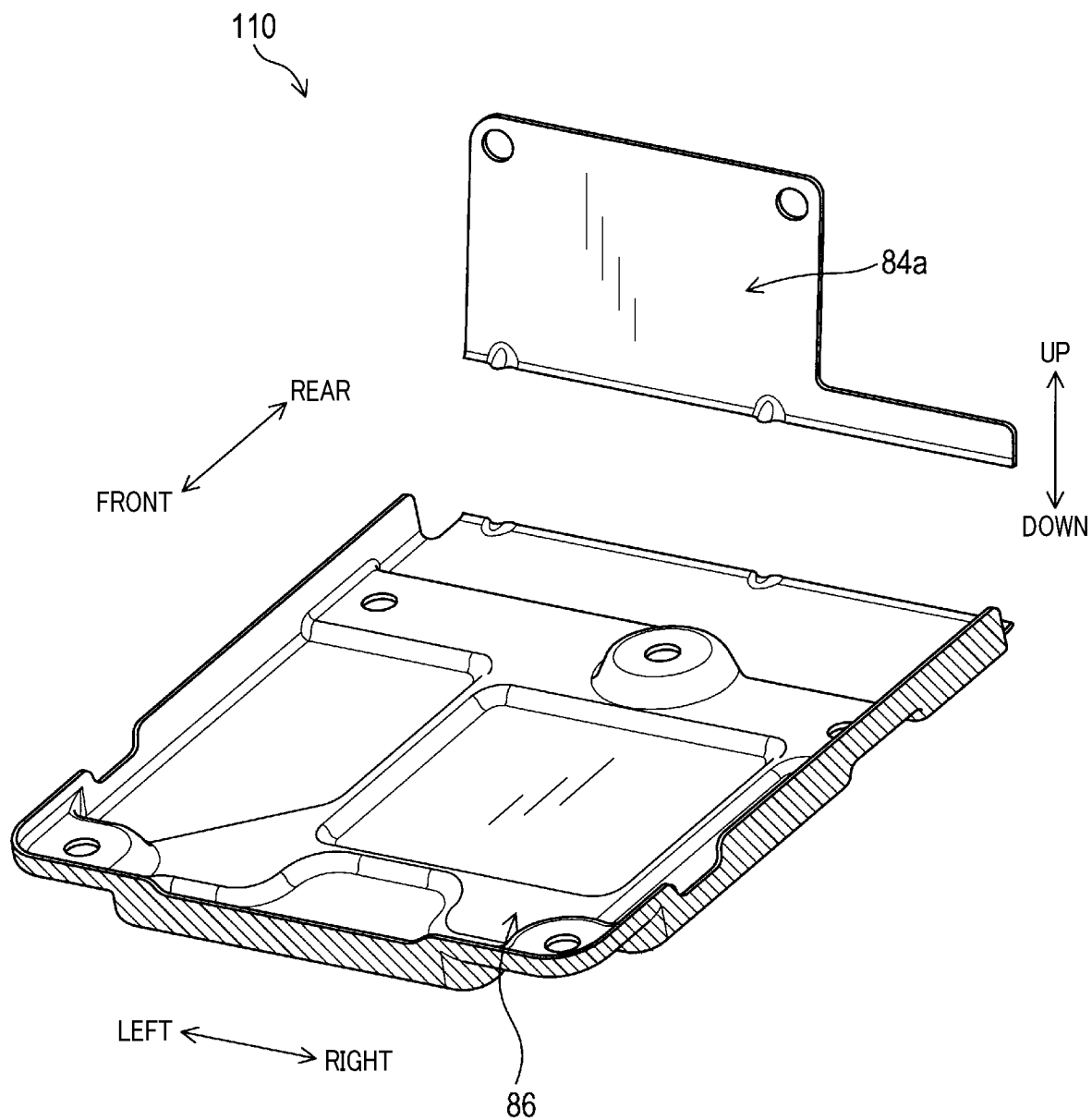
FIG. 7 is an exploded view showing a cover of the imaging device according to the second embodiment.

With reference to FIGS. 6 and 7, a configuration of a second embodiment will be described as follows.

The fundamental configuration of the second embodiment is similar to that of the first embodiment. Hence, only differences are described as follows. The same reference signs as that of the first embodiment refer to the same configuration so that preceding descriptions for the same configuration also apply.

The above-described cover 11 of the first embodiment is integrally formed. However, the cover 110 of the second embodiment differs from the cover 11 of the first embodiment in that the bottom wall 86 and the third portion 84*a* are configured of separate members. The bottom wall 86 and the third portion 84*a* are coupled via a resin material 16. Other structures and materials or the like are the same as that of the first embodiment.

[2-2. Effects and Advantages]

As described, according to the second embodiment, the effects and advantages of the above-described first embodiment can be obtained, and also, the following effects can be obtained as well.

(2a) The bottom wall 86 and the third portion 84*a* are separate members. Hence, compared to an imaging device in which the bottom wall 86 and the third portion 84*a* are integrally formed, heat transfer can be suppressed between the image processing LSI 70 as a heat source and the imaging device 4 that is likely to be affected by heat. As a result, the imaging device 4 can be protected from the heat.

(2b) The bottom wall 86 and the third portion 84*a* are coupled via the resin material 16. Since the resin material 16 has low thermal conductivity, the thermal conductivity of the bottom wall 86 and the third portion 84*a* can be lowered.

Third Embodiment

Embodiments of the present disclosure have been described so far. The present disclosure is not limited to the above-described embodiments, however, various modifications can be made to those embodiments.

(3a) According to the above-described embodiments, as an example, the upper surface 65 of the housing 2 is silver and the lower surface 66 of the housing 2 is black. However, the housing may be coated with two color materials with color combinations in which light reflectance of the upper surface is higher than that of the lower surface. Here, the light reflectance is defined as a reflectance to visible light. It should be noted that the ideal white reflects entire range of the visible light so that the light reflectance thereof is 100%, and the ideal black absorbs entire range of the visible light so that the light reflectance thereof is 0%. Specifically, the upper surface may be white and the lower surface may be black, for example. Also, the upper surface may have a color other than black and the lower surface be black, for example.

Thus, according to the configuration having two colors, heat absorption can be suppressed on the upper surface having high light reflectance, and urges heat radiation from the lower surface having lower light reflectance than the upper surface can be enhanced.

(3b) According to the above-described embodiments, examples are shown in which the casing 10 and the covers 11 and 110 are separate members. However, it is not limited thereto. For example, the casing and the cover may be integrally formed.

(3c) According to the above-described embodiments, an example is shown in which the thermal conduction member 80 is provided as an example. It is not limited thereto. For example, a heat radiation member may be used instead of the heat conduction member 80. The heat radiation member effectively removes heat produced by the processing circuit. As an example of the heat radiation member, a heat dissipation gel can be used.

(3d) According to the above-described embodiments, as an example, the casing 10 and the cover 11 and 110 are configured of aluminum material. However, metal other than aluminum may be used.

(3e) A plurality of functions included in a single element of the above-described embodiments may be achieved by a plurality of elements, or one function included in a single element may be achieved by a plurality of elements. A plurality of functions included in a plurality of elements may be achieved by a single element, or a function achieved by a plurality of elements may be achieved by a single element. Also, a part of configurations of the above-described embodiments can be omitted. At least part of the above-described configuration may be added to other configuration of the above-described embodiments, or may replace other configuration of the above-described embodiments. It should be noted that various aspects inherent in the technical ideas identified by the scope of claims are defined as embodiments of the present disclosure.

What is claimed is:

1. An imaging apparatus installed inside a windshield of a vehicle, capturing images from ahead of the vehicle, the imaging apparatus comprising:

a housing;
a lens exposed to a part of the housing, the lens obtaining an optical image ahead of the vehicle;
an imaging device provided in the housing, converting the optical image into an electrical image signal; and
a processing board including a processing circuit that executes signal processing of the electrical image signal converted by the imaging device, wherein
the housing includes a first portion and a second portion in a state where the housing is installed inside the windshield, the first portion being a portion of the housing facing the windshield, and the second portion being a portion of the housing located opposite to the first portion, the first portion having a first outer surface as an outer surface thereof, and the second portion having a second outer surface as an outer surface thereof;
the first outer surface has a light reflectance which is larger than a light reflectance of the second outer surface; and
the processing board is provided in the housing, and the processing circuit is provided on the processing board, facing the second portion only;
the second portion is provided with a thermal conduction member on an interior surface of the second portion;
the processing circuit contacts with the second portion via the thermal conduction member;
the thermal conduction member contacts with the processing circuit and the interior surface of the second portion; and
the second portion that contacts with the thermal conduction member includes a concave portion which is hollow in a portion opposite to the processing circuit.

2. The imaging apparatus according to claim 1, wherein the second outer surface is black.

3. The imaging apparatus according to claim 1, wherein the housing is provided with a casing having a first portion, and a cover having a second portion, the casing and the cover are separate members.

4. The imaging apparatus according to claim 3, wherein the casing, the cover and the processing board are co-fastened.

5. The imaging apparatus according to claim 1, wherein the housing has a third portion;
the imaging device is disposed inside the third portion; and
the third portion is extends towards the first portion from the second portion on a rear side of the housing with respect to the vehicle, in a state where the housing is installed inside the windshield.

6. The imaging apparatus according to claim 5, wherein the third portion and the second portion are separate members.

7. The imaging apparatus according to claim 6, wherein the second portion and the third portion are coupled via a resin material.

8. The imaging apparatus according to claim 1, wherein the second outer surface of the second portion faces a vehicle cabin.

9. The imaging apparatus according to claim 5, the first portion further comprising:
a rising portion protruding outward from the first portion in a direction away from the first outer surface, the rising portion configured to house the lens and the imaging device.

10. The imaging apparatus according to claim 9, wherein the processing circuit is positioned a distance apart from the rising portion in a direction towards a front of the vehicle.

11. The imaging apparatus according to claim 9, wherein the third portion is fastened to a side of the rising portion opposite a lens opening.

12. The imaging apparatus according to claim 1, wherein the thermal conduction member is positioned within the concave portion of the second portion.

* * * * *